United States Patent
Britsch

(10) Patent No.: US 8,204,041 B2
(45) Date of Patent: Jun. 19, 2012

(54) METHOD AND SYSTEM FOR IMPLEMENTING A PUSH-TO-TALK SERVICE IN A MOBILE RADIO COMMUNICATION NETWORK OF THE GSM-TYPE

(75) Inventor: Matthias Britsch, Königswinter (DE)

(73) Assignee: T-Mobile Deutschland GmbH, Bonn (DE)

( * ) Notice: Subject to any disclaimer, the term of this patent is extended or adjusted under 35 U.S.C. 154(b) by 1238 days.

(21) Appl. No.: 10/557,058

(22) PCT Filed: May 19, 2004

(86) PCT No.: PCT/EP2004/005410
§ 371 (c)(1),
(2), (4) Date: Feb. 20, 2006

(87) PCT Pub. No.: WO2004/105413
PCT Pub. Date: Dec. 2, 2004

(65) Prior Publication Data
US 2007/0008960 A1    Jan. 11, 2007

(30) Foreign Application Priority Data
May 20, 2003   (EP) .................................... 03011407

(51) Int. Cl.
*H04L 12/66* (2006.01)
(52) U.S. Cl. ........ 370/352; 370/310; 370/312; 370/335; 370/336; 370/389; 455/518; 455/519; 709/204
(58) Field of Classification Search .................. 370/389
See application file for complete search history.

(56) References Cited

U.S. PATENT DOCUMENTS

| | | | |
|---|---|---|---|
| 5,506,837 A | 4/1996 | Sollner et al. | |
| 6,839,356 B2 | 1/2005 | Barany et al. | |
| 7,099,291 B2 | 8/2006 | Harris et al. | |
| 7,107,017 B2* | 9/2006 | Koskelainen et al. | 455/90.2 |
| 7,170,863 B1* | 1/2007 | Denman et al. | 370/260 |
| 2002/0150091 A1* | 10/2002 | Lopponen et al. | 370/389 |
| 2003/0053434 A1* | 3/2003 | Chow et al. | 370/338 |
| 2004/0008679 A1* | 1/2004 | Sinnarajah et al. | 370/390 |
| 2004/0100940 A1* | 5/2004 | Kuure et al. | 370/349 |
| 2004/0190489 A1* | 9/2004 | Palaez et al. | 370/351 |
| 2004/0192364 A1* | 9/2004 | Ranalli et al. | 455/517 |
| 2004/0224710 A1* | 11/2004 | Koskelainen et al. | 455/518 |

(Continued)

FOREIGN PATENT DOCUMENTS
EP       1 182 895       2/2002
(Continued)

OTHER PUBLICATIONS

English translation of the Office Action mailed Sep. 1, 2009 in related Japanese application No. 2006-529877.

(Continued)

*Primary Examiner* — Jae Y Lee
(74) *Attorney, Agent, or Firm* — Faegre Baker Daniels LLP

(57) ABSTRACT

The present invention relates to a method for transmitting user data via a dialed connection in a radio communication network, characterized in that the user data are transmitted as dedicated data packets upon controlled release. A dedicated push-to-talk domain is provided which is hosting push-to-talk service network nodes (PTT SNN) and application servers (AS).

12 Claims, 1 Drawing Sheet

U.S. PATENT DOCUMENTS

2004/0259581 A1* 12/2004 Crisler et al. ............... 455/519
2004/0266468 A1* 12/2004 Brown et al. ............... 455/518
2005/0111361 A1*  5/2005 Hosein ........................ 370/230
2005/0239485 A1* 10/2005 Kundu et al. ............... 455/519

FOREIGN PATENT DOCUMENTS

| JP | 06-350519 A   | 12/1994 |
| JP | 2003-087513 A | 3/2003  |
| JP | 2003-092776 A | 3/2003  |
| JP | 2003-524344 T | 8/2003  |
| WO | WO01/63898 A2 | 8/2001  |
| WO | WO 01/67674   | 9/2001  |

OTHER PUBLICATIONS

English translation of the Office Action mailed Feb. 16, 2010 in related Japanese application No. 2006-529877.

* cited by examiner

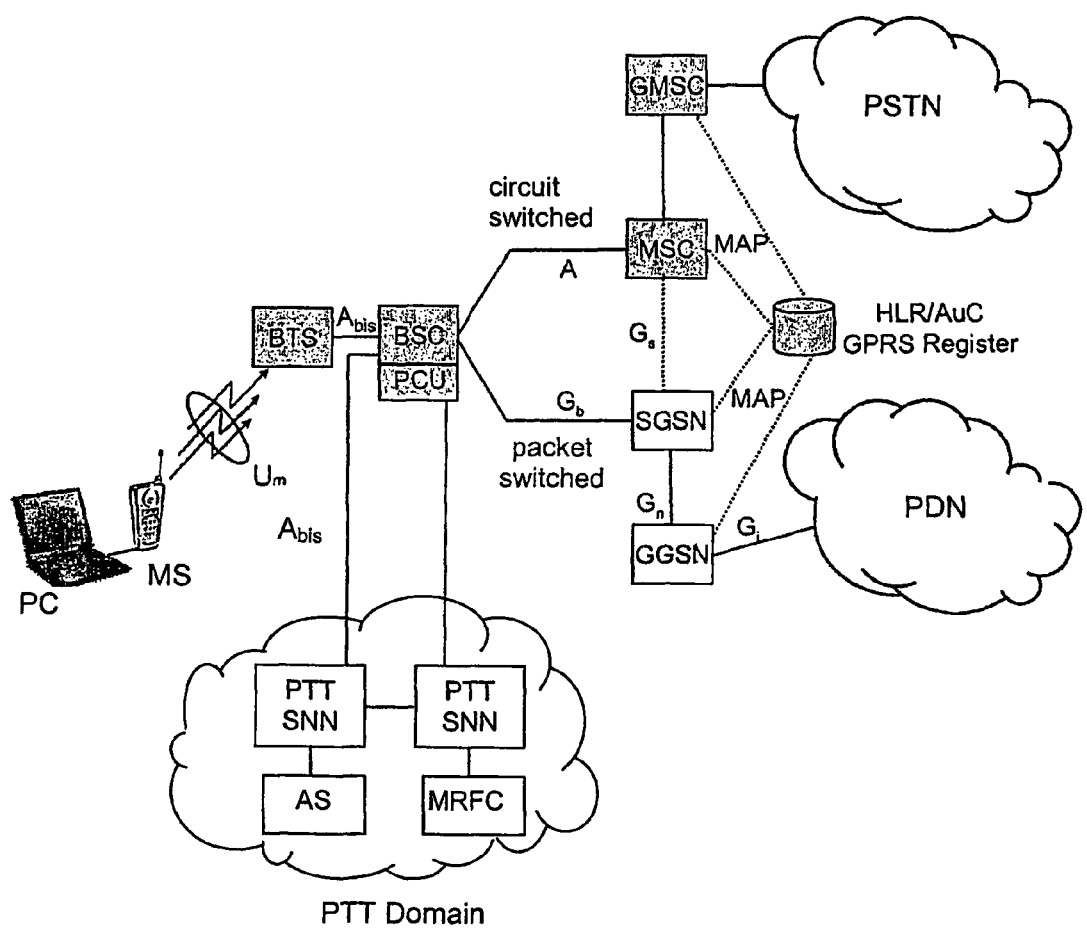

METHOD AND SYSTEM FOR IMPLEMENTING A PUSH-TO-TALK SERVICE IN A MOBILE RADIO COMMUNICATION NETWORK OF THE GSM-TYPE

BACKGROUND

The invention relates to a method and system for transmitting user data via a dialled connection in a radio communication network according to the preamble of the independent claims.

The communication pattern of a push-to-talk service doesn't allow its implementation in a GSM (2G) or GPRS (2.5G) network, neither circuit switched (CS) nor packet switched (PS) domain, in an efficient and performant way. While the performance in the CS domain would be sufficient in terms of call setup and delay, the consumption of air interface resources would be enormously high. The PS domain features would allow efficient use of resources, especially at the air interface, but the resulting performance would not be able to reach those of the CS domain in terms of delay and call setup time.

SUMMARY

It is the objective of the present invention to implementing a push-to-talk service in a mobile radio communication network of the GSM-type by making use of a GSM networks base station subsystem (BSS system).

This objective is achieved by providing method and a system as described in the independent claims.

Other features which are considered to be characteristic for the invention are set forth in the appended claims.

To overcome the prior art restrictions the implementation of a push-to-talk technical means according to the present invention makes use of enhanced features in a BSS system to enable interconnection of the end devices with a dedicated "push-to-talk domain", hosting the push-to-talk service network nodes (PTT SNN) and application servers (AS).

The basic idea is to use dynamic time slot assignment as already implemented in TMO's network by a number of suppliers. Currently this feature is used to allow dynamic assignment of timeslots on the air interface to GPRS and voice sessions for optimisation of air interface resources.

The push-to-talk domain according to the invention would allocate it's own timeslots and connect directly to the base station controller. This can be either done in circuit switch style, using a voice channel on the Abis interface, or in packet switched style, by connecting directly to the PCU card.

BRIEF DESCRIPTION OF THE DRAWINGS

One example of an implementation using a GSM network is described in connection with FIG. 1.

DETAILED DESCRIPTION

The overall architecture of the invention follows the structure of the already introduced circuit and packet switched domains of 2 and 2.5G networks, introducing so to say a new "PTT domain" besides PS and CS domain, connecting to the existing BSS.

FIG. 1 shows the system architecture of a GSM and GPRS public land mobile network (PLMN) with essential components. A GSM mobile station is denoted as MS. The mobile station can be connected to a personal computer PC. A radio cell is covered by at least one a base transceiver station (BTS).

Several BTSs together are controlled by one base station controller (BSC). The BTS and BSC together form the base station subsystem (BSS). The combined traffic of the mobile stations in their respective cells is routed through a switch, the mobile switching center (MSC). User data are stored in the home location register (HLR) and GPRS register, respectively. Connections originating from or terminating in the fixed network (PSTN), e.g. ISDN, are handled by a dedicated gateway mobile switching center (GMSC).

In order to integrate GPRS into the existing GSM architecture, a new class of network nodes, called GPRS support nodes (GSN), has been introduced. GSNs are responsible for the delivery and routing of data packets between the mobile stations MS and the external packet data networks (PDN). A serving GPRS support node (SGSN) is responsible for the delivery of data packets from and to the mobile station MS within its service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address(es) used in the packet data network) of all GPRS users registered with this SGSN.

A gateway GPRS support node (GGSN) acts as an interface between the GPRS backbone network and the external packet data networks. It converts the GPRS packets coming from the SGSN into the appropriate packet data protocol (PDP) format (e.g., IP or X.25) and sends them out on the corresponding packet data network. In the other direction, PDP addresses of incoming data packets are converted to the GSM address of the destination user. The readdressed packets are sent to the responsible SGSN. For this purpose, the GGSN stores the current SGSN address of the user and his or her profile in its location register. The GGSN also performs authentication and charging functions.

FIG. 1 also shows the interfaces between the GPRS network nodes and the GSM network nodes as defined by ETSI. The Gb interface connects the BSC with the SGSN. Via the Gn interface, user data and signaling data are transmitted between the GSNs. The Gn interface will be used if SGSN and GGSN are located in the same PLMN. The Gs interface connects the SGSN to the MSC.

The PTT domain serves the needs of push-to-talk services, providing call setup times and transmission delays which are in the range of circuit switched domain connections, while supporting the communication patterns of PTT subscribers without waste of air interface resources. The technology of the core network can be either packet based, making use of PCU connections at the BSC or circuit oriented, connecting to the Abis interface.

For packet based applications a Multimedia Resource Function (MRFP) as described in 3GPP specification will most likely be used, controlled by an application server which is acting as MRFC. However solutions are possible which rely on different architectures, thus comprising different network elements. For circuit oriented architectures a possible implementation could make use of an IN system in combination with an existing conferencing server for CS connections.

Signalling to the end device MS/PC is done via the usually used signalling channels of the GSM and GPRS network. All mobility management and authentication features of the existing network remain unchanged. In fact the "PTT domain" does not include any mobility management or authentication features. Rather it makes use of the authentication performed in the GSM network and relies on it. If the service logic requires any check of the authentication or any interworking with the client, including authentication mechanisms, the necessary information shall be requested from the HLR/AC via standard interfaces.

The same principle of relying on information of the GSM standard procedure rather than implementing features for handling it by its own, shall be applied for mobility management in the "PTT domain". All relevant mobility management within a base station controller area (CID handover) shall be handled by the BSS systems transparently. For handovers impacting more than one BSC or one or more MSC's the application servers in the "PTT domain's" core network shall handle the mobility management by it's own, making use of the location and mobility management information to be retrieved from the GSM network via standard procedures, as e.g. CID information kept by the BSC, VLR ID requested by the MSC and HLR requests such as ANY-TIME-INTERROGATION, LOCATION-INFORMATION, etc.

Handling of broadcast, which is a central part of PTT communication patterns is done with via multicast mechanism on the air interface. Each subscriber (client) to be included in the multicast group gets the information necessary to listen to the multicast channel via GSM signalling channels. If the user wishes to contribute to the discussion on the multicast channel, a new uplink connection is set up on a different channel. On the network side especially in the existing PS and CS domain the broadcast channels are transparent channels, which are in no way differ from the usual voice and data channels. In case the solution is implemented using GPRS data connections on the air interface the usage of the DRX feature shall be enabled to allow power saving implementation of the PTT client in the mobile devices. For CS domain clients any proprietary or standardised solution may be used to enable power saving mode.

On the client side the application sits direct on top of the radio layer, which is necessary to handle broadcasts with separate up- and downlink channels, multiple connections, etc which is necessary to support the communication pattern of PTT services. Please note that it may be possible that the user is engaged in several multicast sessions at the same time, thus the end device has to listen to several broadcast channels in parallel.

Billing and administration tasks dedicated to the PTT service will be handled separately in the PTT domain. All functions related to provisioning, administration and billing existing in the GSM network shall be untouched. In case interworking correlation or the like functions are necessary it shall be implemented in the IT layer back end systems. The "PTT domain" shall implement it's own functions for that task and all functions shall not enforce changes in the PS and CS domain.

LIST OF ABBREVATIONS

GSM Global Standard for Mobile Communication
BSS Base Station Subsystem
GPRS General Packet Radio Service
2G Second Generation
2.5G Second and a half Generation
CS circuit switched
PS packet switched
TMO T-Mobile
PCU packet control unit
PTT push-to-talk
Abis "the Abis interface as standardised by ETSI"
PCU Packet Control Unit
MRFP Multimedia Resource Function Platform
MRFC Multimedia Resource Function Controller
3GPP $3^{rd}$ Generation Partnership Project
IN Intelligent Networking
GPRS General Packet Radio Service
HLR Home Location Register
AC Authentication Center
HLR/AC Home Location Register/Authentication Center
CID Cell Identity
BSC Base Station Controller
MSC Mobile Switching Center
VLR Visitor Location Register
VLR ID Visitor Location Register Identity
DRX Discontinous Reception Mode
IT Information Technology

The invention claimed is:

1. A method for transmitting user data via a dialed connection in a Global System for Mobile Communications (GSM)-type radio communication network having a circuit switched domain and a packet switched domain, comprising:
    transmitting the user data as dedicated data packets upon controlled release on a user end device;
    providing a dedicated push-to-talk (PTT) domain which offers push-to-talk (PTT) services and which hosts push-to-talk service network nodes (PTT SNN) and application servers (AS); and
    using dynamic time slot assignment such that the push-to-talk (PTT) domain connects directly to a base station controller (BSC) and a packet control unit (PCU) via push-to-talk service network nodes (PTT SNN) and allocates its own time slots in the base station controller (BSC) and the packet control unit (PCU), the push-to-talk (PTT) domain being separated from the circuit switched and packet switched domains and connecting to the base station controller (BSC) and packet control unit (PCU) without connecting through the circuit switched and packet switched domains, the push-to-talk (PTT) domain connecting to the circuit switched and packet switched domains only through the base station controller (BSC) and the packet control unit (PCU), respectively,
    wherein the push-to-talk service network nodes (PTT SNN) are directly connected to the base station controller (BSC) and the packet control unit (PCU) via a voice channel Abis interface;
    accessing, by the user end device included in a plurality of multicast sessions simultaneously, multiple multicast channels in parallel.

2. The method according to claim 1, further comprising using, in packet based applications, a Multimedia Resource Function (MRFP) controlled by an application server which is acting as a multimedia resource controller (MRFC).

3. The method according to claim 2, wherein an intelligent network (IN) system in combination with an existing conferencing server for circuit switched (CS) connections is used for circuit oriented architectures.

4. The method according to claim 2, wherein signaling to user end devices is done via signaling channels of the Global System for Mobile Communications (GSM) network and an associated general packet radio service General Packet Radio Service (GPRS) network.

5. The method according to claim 1, wherein an intelligent network (IN) system in combination with an existing conferencing server for circuit switched (CS) connections is used for circuit oriented architectures.

6. The method according to claim 1, wherein signaling to user end devices is done via signaling channels of the Global System for Mobile Communications (GSM) network and an associated general packet radio service General Packet Radio Service (GPRS) network.

7. The method according to claim 1, wherein handling of broadcast, which is a central part of PTT communication patterns, is done via a multicast mechanism on an air interface.

8. The method according to claim 1, further comprising including handling billing and administration tasks dedicated to the PTT service separately in the PTT domain.

9. The method according to claim 1, wherein signaling to user end devices is done via signaling channels of the Global System for Mobile Communications (GSM) network and an associated general packet radio service General Packet Radio Service (GPRS) network.

10. A method for transmitting user data via a dialed connection in a Global System for Mobile Communications (GSM)-type radio communication network having a circuit switched domain and a packet switched domain, comprising:
transmitting the user data as dedicated data packets upon controlled release on a subscriber end device;
providing a dedicated push-to-talk (PTT) domain which offers push-to-talk (PTT) services and which hosts push-to-talk service network nodes (PTT SNN) and application servers (AS); and
using dynamic time slot assignment such that the push-to-talk (PTT) domain connects directly to a base station controller (BSC) and a packet control unit (PCU) via push-to-talk service network nodes (PTT SNN) and allocates its own time slots in the base station controller (BSC) and the packet control unit (PCU), the push-to-talk (PTT) domain being separated from the circuit switched and packet switched domains and connecting to the base station controller (BSC) and packet control unit (PCU) without connecting through the circuit switched and packet switched domains, the push-to-talk (PTT) domain connecting to the circuit switched and packet switched domains only through the base station controller (BSC) and the packet control unit (PCU), respectively,
wherein a subscriber to be included in a multicast group gets information necessary to listen to a multicast channel via Global System for Mobile Communications (GSM) signaling channels, and if such subscriber wishes to contribute to a discussion on the multicast channel, a new uplink connection is set up on a channel different from the multicast channel, wherein the push-to-talk service network nodes (PTT SNN) are directly connected to the base station controller (BSC) and the packet control unit (PCU) using a voice channel Abis interface,
wherein handling of broadcast, which is a central part of PTT communication patterns, is done via a multicast mechanism on an air interface;
accessing, by the subscriber end device included in a plurality of multicast sessions simultaneously, multiple multicast channels in parallel.

11. A system for the transmission of user data via a dialed connection in a Global System for Mobile communications (GSM)-type radio communication network having a circuit switched domain and a packet switched domain, comprising:
a user end device that transmits the user data as dedicated packets upon controlled release;
a dedicated push-to-talk (PTT) domain that provides push-to-talk services and comprises push-to-talk service network nodes (PTT SNN) and application servers (AS);
the push-to-talk domain with its push-to-talk service network nodes (PTT SNN) being directly connected to a base station controller (BSC) and a packet control unit (PCU) at the base station controller (BSC) in a manner whereby the push-to-talk (PTT) domain dynamically allocates its own time slots in the base station controller (BSC) and the packet control unit (PCU), the push-to-talk (PTT) domain being separated from the circuit switched and packet switched domains and connecting to the base station controller (BSC) and packet control unit (PCU) without connecting through the circuit switched and packet switched domains, the push-to-talk (PTT) domain connecting to the circuit switched) and packet switched domains only through the base station controller (BSC)) and the packet control unit (PCU), respectively,
wherein the push-to-talk service network nodes (PTT SNN) are directly connected to the base station controller (BSC) and the packet control unit (PCU) via a voice channel Abis interface;
accessing, by the user end device included in a plurality of multicast sessions simultaneously, multiple multicast channels in parallel.

12. The system according to claim 11, wherein the packet control unit (PCU) is located in a transmission path.

* * * * *